United States Patent Office 3,567,308
Patented Mar. 2, 1971

3,567,308
RARE-EARTH CHALCOGENIDE MAGNETO-OPTICAL ELEMENTS WITH PROTECTIVE LAYERS
Kie Y. Ahn, Bedford, and Siegfried Methfessel, Montrose, N.Y., assignors to International Business Machines Corporation, Armonk, N.Y.
Filed Dec. 22, 1966, Ser. No. 603,933
Int. Cl. G02f 1/22
U.S. Cl. 350—151                      5 Claims

ABSTRACT OF THE DISCLOSURE

The present invention relates to a novel magneto-optical device composed of a rare-earth chalcogenide.

When such rare-earth chalcogenides are made in the form of crystals or of thin layers, they are subject to deterioration by exposure to the atmosphere. The use of a thin overlying protective layer having optical and magnetic properties compatible with the underlying rare-earth chalcogenide is highly desirable. In one example, $Eu_2O_3$ is employed as the protective layer for EuO.

CROSS-REFERENCE TO RELATED APPLICATIONS

Rare-earth compounds, i.e. EuO, EuS, EuSe, EuTe, etc., are being used in a variety of ways as magneto-optically active elements in optical systems because they have high Faraday rotation and Kerr rotation constants. An application filed for "Magneto-Optical Rotation Device," by Frederic Holtzberg et al. on Nov. 16, 1964, Ser. No. 411,525, and assigned to the assignee of the instant application, now U.S. Pat. No. 3,418,036, discloses and claims a class of europium chalcogenides as suitable materials useful for making magneto-optically active elements.

BACKGROUND OF THE INVENTION

Most rare-earth compounds are highly chemically active and when exposed to normal atmospheric conditions will deteriorate. Unless a protective layer is employed with the rare-earth chalcogenide that is employed as part of an optical element or system, the deterioration of such chalcogenide will diminish the life of the optical element.

However, when a protective layer is used, the latter must have a high transparency for the light used in conjunction with the rare-earth chalcogenide and also must have an index of refraction that matches the index of refraction of the rare-earth chalcogenide being protected. If desired, the thickness of the protective layer can be selected to serve alone, or in combination with other transparent layers, to increase the magneto-optical rotation employing the principle of light interference. See "Optical Properties of Various Evaporated Rare Earth Oxides and Fluorides," G. Haas et al., JOPS of America, vol. 49, No. 2, February 1959, pp. 116–120.

SUMMARY OF INVENTION

The protective layer relied upon in this invention is $Eu_2O_2$ (europium sesquioxide) and the particular rare-earth chalcogenide to be protected is EuO (europium monoxide), although other rare-earth chalcogenides can be so protected. EuO has an exceptionally high magneto-optical activity for red light, e.g., Faraday rotation constant of $6 \times 10^5$ degrees/cm. at a wavelength of 7,000 A., and it is highly desirable to obtain a thin protective layer for EuO that would be compatible with such rare-earth chalcogenide. $Eu_2O_3$ has been discovered to be a protective layer that is particularly well suited for use with EuO.

One method for making an EuO film having a compatible superimposed protective layer of $Eu_2O_3$ comprises evaporating the $Eu_2O_3$ by electron bombardment of a source of $Eu_2O_3$ immediately after the EuO layer has been laid down. The electron bombardment vaporizes $Eu_2O_3$ from the source, the latter being in the same evacuated chamber as the deposited EuO film, and $Eu_2O_3$ condenses onto the EuO film. The thickness of the $Eu_2O_3$ film can be varied to suit the wavelength characteristics of the light beam used for recording on or reading out information from the EuO film.

A second method for producing the $Eu_2O_3$ protective film comprises depositing a predetermined thickness of EuO onto a substrate. During the last phase of such EuO film evaporation, oxygen is bled into the evacuated chamber housing the EuO film to cause EuO and $O_2$ to react and produce a layer of $Eu_2O_3$.

Thus, it is an object of this invention to obtain a suitable protective film for EuO.

It is yet another object to obtain a protective film for EuO that is compatible with both the light transmission properties and index of refraction of EuO.

Still another object is to obtain a protective film for a rare-earth chalcogenide that is highly transparent and has such a thickness that it increases rather than perturbs the magneto-optical application of EuO at certain wavelengths of light.

The foregoing and other objects, features and advantages of the invention will be apparent from the following more particular description of preferred embodiments of the invention, as illustrated in the accompanying drawings.

DESCRIPTION OF THE PREFERRED EMBODIMENTS

Figure 1:
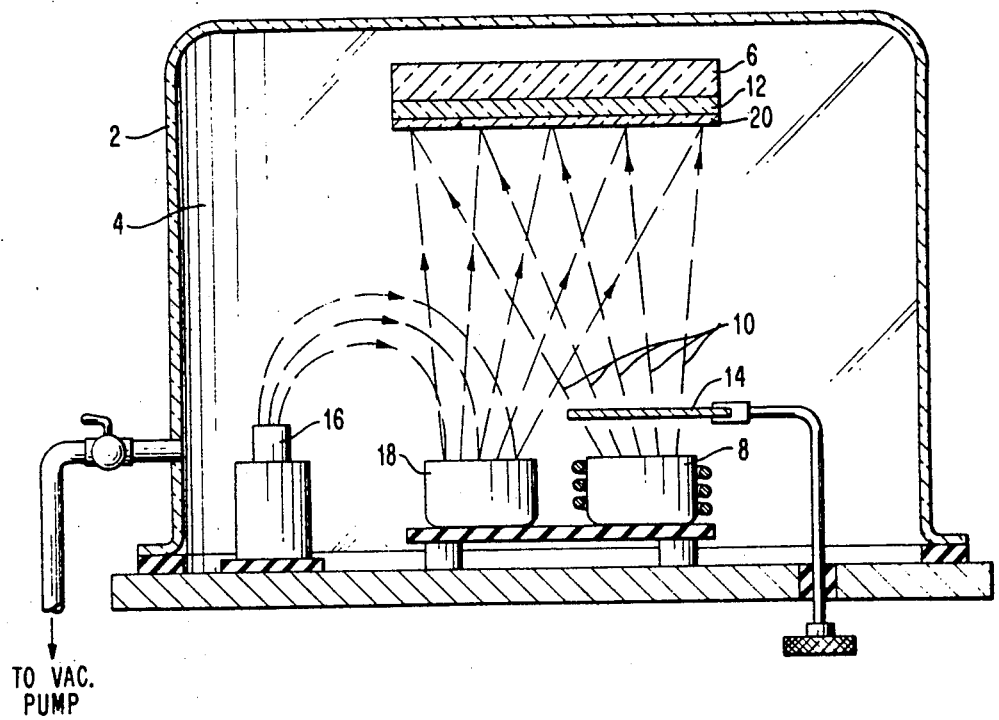
FIG. 1 schematically shows an apparatus for making a protective film of $Eu_2O_3$ for a film of EuO or any other rare-earth chalcogenide.

In FIG. 1, bell jar 2 represents schematically an evacuated chamber housing and the vacuum in chamber 4 is maintained at $1 \times 10^{-5}$ mm. of Hg or better. A substrate 6 of glass, quartz, or other nonreacting material is conventionally supported in the chamber 4. The substrate 6 is cleaned prior to being placed in chamber 4 and can be maintained at any temperature between 20° C. to 500° C. EuO is contained in a refractory crucible 8 and by induction heating or other means, not shown, the EuO is raised to a temperature near or beyond its melting point, causing EuO vapor 10 to condense as layer 12 onto substrate 6. Thickness of the EuO film 12 can be monitored by well-known means that are not a part of this invention. When a predetermined or desired thickness of EuO has been deposited, the heating means applied to the crucible 8 is cut off or a shutter 14 is interposed between the EuO source and substrate 6.

Soon after the termination of EuO deposition, an electron gun source 16 is turned on and a slug 18 of $Eu_2O_3$ is bombarded with electrons. By bombarding the $Eu_2O_3$ slug with an input power of approximately 1000 watts or more, a layer 20 of $Eu_2O_3$ is built upon EuO layer 12 at a rate of 5 to 20 angstroms per second.

The finished device comprising substrate 6, EuO layer 12 and $Eu_2O_3$ layer 20 can be used in an optical device or system where it is desired to employ either the Faraday or the Kerr effect. The Faraday effect is that characteristic of a substance which rotates the plane of polarized light passing through it when magnetized by an applied magnetic field, provided there is a component of the magnetic field that is parallel to the polarized light, while the Kerr effect is that characteristic of a substance which rotates the plane of polarized light reflected upon the magnetized magneto-optical surface. When the $Eu_2O_3$ protected EuO layer of this invention is employed to make use of the above mentioned magneto-optical effect, it is necessary for the substrate 6 to be transparent.

Where it is desired to direct a polarized light beam through the magneto-optically active EuO layer, so as to rotate the plane of polarization of the light traversing the EuO, then reflect such transmitted light back through the EuO so as to again rotate the plane of polarization of the light beam, then the substrate 6 need not be transparent but could be made of metal or any other substance that is highly reflective of the polarized beam making the multiple traverses through the EuO layer.

Figure 2:
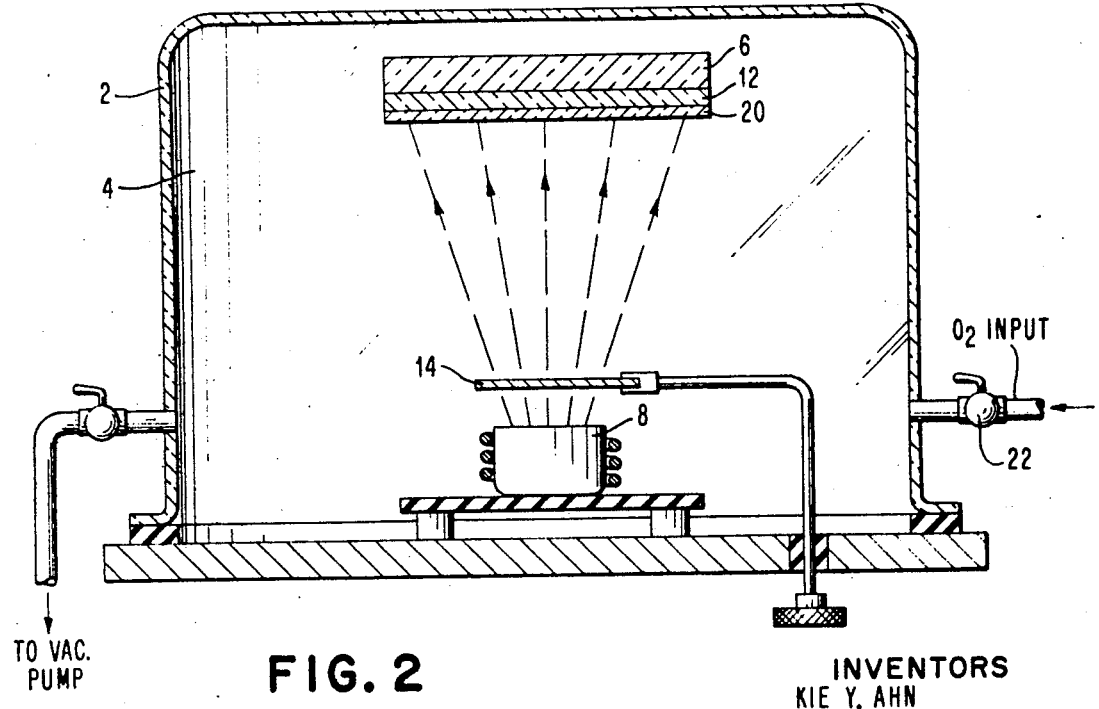
FIG. 2 is a slight modification of the apparatus of FIG. 1 for illustrating a second method for obtaining a protective film of $Eu_2O_3$ on EuO.

FIG. 2 depicts an apparatus that carries out another method of fabricating an $Eu_2O_3$ protective layer 20 onto a magneto-optically active layer of EuO 12. The vacuum of chamber 4 is maintained at $1 \times 10^{-5}$ mm. of Hg or better, and the substrate 6 is kept at a temperature of 20° C. to 200° C. Induction heating of EuO source 8 is controlled so that EuO is evaporated from crucible 8 at a rate of about 10 angstroms/sec. After a desired thickness of EuO has been deposited, oxygen is bled into the chamber 4 through valve 22 at a partial pressure of the order of $10^{-5}$ mm. of Hg. In ten seconds, a total thickness of about 100 angstroms of $Eu_2O_3$ is deposited. It is readily seen that one may obtain varying thicknesses of EuO or $Eu_2O_3$ by changing either the times of deposition or the rates of deposition.

A further method of depositing a protective layer of $Eu_2O_3$ on EuO is to complete the deposition of EuO layer 12 while maintaining the substrate 6 at a temperature of 20°–200° C. and the vacuum conditions the same as above. After such completion of EuO deposition, the temperature of substrate 6 is raised to over 200° C. and oxygen is bled into the chamber at a partial pressure of $10^{-5}$ mm. of Hg. After about ten minutes, a 100 angstrom thick layer of $Eu_2O_3$ is built up on the EuO layer 12.

The improved stability of an EuO layer protected by $Eu_2O_3$ is demonstrated by crystal-structure observations with X-rays.

Figure 3:
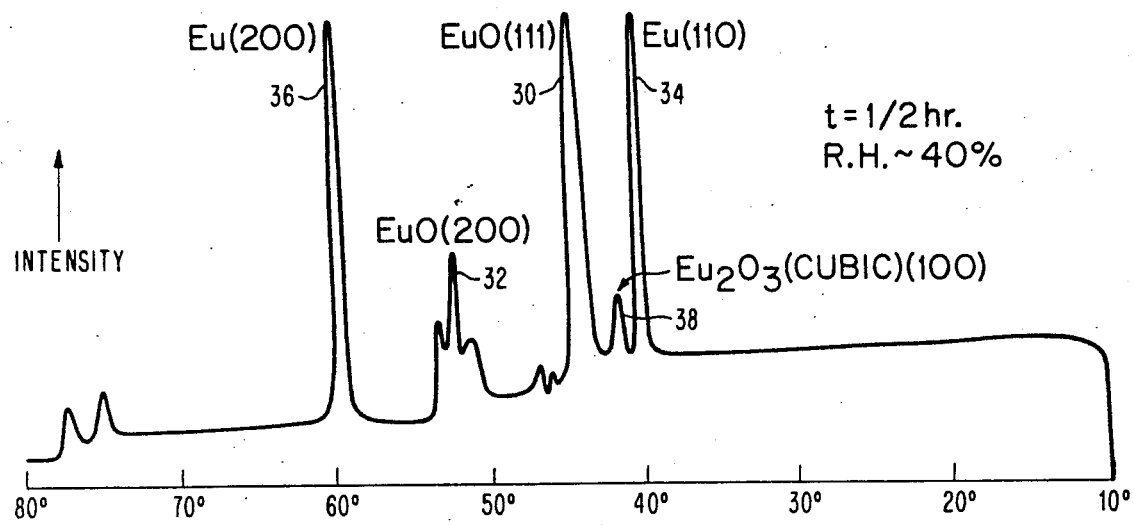
FIGS. 3 to 5 are graphs illustrating the effectiveness of $Eu_2O_3$ as a protective layer for a magneto-optically active element such as EuO.

FIG. 3 is a plot of X-ray intensity of an X-ray beam reflected from certain planes of an EuO layer protected by $Eu_2O_3$ versus the Bragg angle at which such reflecting X-ray beam was incident on such planes. The plot was taken when the relative humidity of the air was about 40%, and the $Eu_2O_3$ protected layer of EuO was exposed for ½ hour. Curves 30 and 32 show strong presence of EuO, curves 34 and 36 show the presence of Eu and curve 38 the presence of $Eu_2O_3$.

Figure 4:
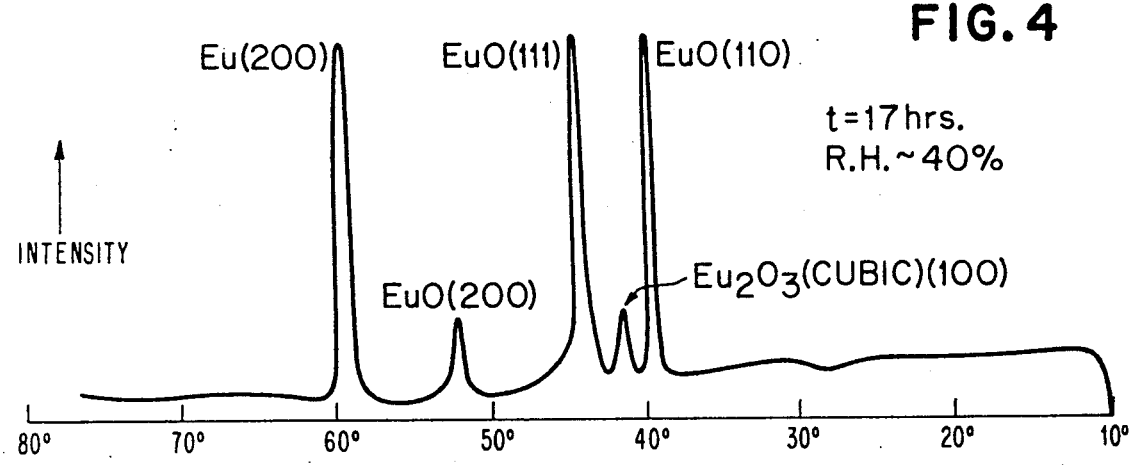

FIG. 4 is the same plot of FIG. 3 but after a time lapse of 17 hours exposure to substantially the same atmosphere as the sample of FIG. 1, and it is seen that there is no deterioration of the EuO layer and its protective coating.

Figure 5:
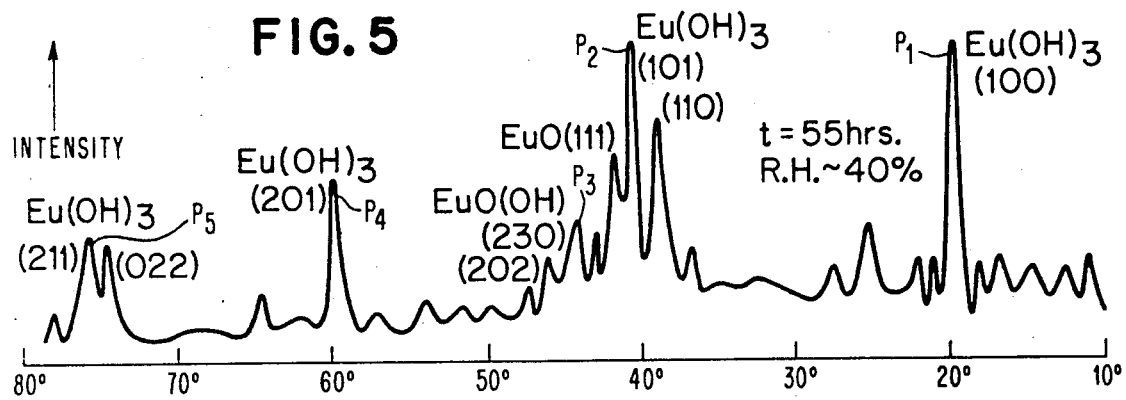

FIG. 5 is the same plot as FIGS. 3 and 4 in air with about 40% relative humidity but after a passage of 55 hours. Peaks $P_1$–$P_5$ show the presence of $Eu(OH)_3$, the latter being milky in appearance and exhibiting reduced light transmission. However, since EuO protected by $Eu_2O_3$ is normally employed at relatively low temperatures, below 50° K., to obtain the benefits of its high magneto-optical rotations, there is a very low probability of $Eu_2O_3$ becoming $Eu(OH)_3$. The numbers appearing in parentheses after the metal or compound, such as Eu (200), EuO (111), etc. represent the planes from which intensity of X-ray reflection was observed.

$Eu_2O_3$ is particularly suitable for protecting EuO because it is very transparent in the wavelength range of 2 microns to 0.3 micron. Moreover, it has an index of refraction equal to that of EuO so that it is an excellent impedance match for EuO. The protective layer of $Eu_2O_3$ is exceedingly stable. If desired, one may build up a plurality of alternate layers of EuO and $Eu_2O_3$ if one requires many such thin film layers for operation. The thickness of the layers will be chosen in such a way that a maximum magneto-optical effect is obtained by considering light interference effects taking place in these layers.

Moreover, $Eu_2O_3$ has very good mechanical characteristics, that is, it is very hard and not readily scratched or scuffed. It is also understood that the protective layer of $Eu_2O_3$ can be applied to solid magneto-optically active surfaces, such as crystals, instead of evaporated thin films.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A magneto-optically active element comprising a layer of a rare-earth chalcogenide and a film of europium sesquioxide deposited on the exposed portion of said rare-earth chalcogenide as a protective layer, said two layers being highly transparent to optical frequencies and having matching indices of light refraction and said two layers being of thicknesses suitable to the optical interference of wavelengths of light incident on said element.

2. A magneto-optically active element comprising a substrate,
   a film of europium monoxide deposited thereon, and
   a film of europium sesquioxide deposited as a protective layer on the exposed portion of said europous oxide film, said two films being of thicknesses suitable to the optical interference of wavelengths of light incident on said element.

3. A magneto-optically active element as set forth in claim 2 wherein said europium monoxide film and europium sesquioxide film are each of the order of 5,000 angstroms or less.

4. A magneto-optically active element comprising a substrate,
   a plurality of transparent films deposited thereon,
   said plurality of films being alternate depositions of EuO and $Eu_2O_3$, and said film of $Eu_2O_3$ being the outermost film from said substrate of said plurality of films and each of said films being of thicknesses suitable to the optical interference of wavelengths of light incident on said element.

5. The magneto-optically active element of claim 4 wherein each of said alternate films is of the order of 5,000 angstroms or less.

References Cited

UNITED STATES PATENTS

| | | | |
|---|---|---|---|
| 3,142,720 | 7/1964 | Adams | 350—151 |
| 3,224,333 | 12/1965 | Kolk, Jr., et al. | 350—151 |
| 3,370,916 | 2/1968 | Shafer | 350—151UX |
| 3,376,157 | 4/1968 | Guerci et al. | 350—151X |
| 3,393,957 | 7/1968 | Smith | 350—151 |
| 3,394,360 | 7/1968 | Miyata | 350—151UX |
| 3,418,036 | 12/1968 | Holtzberg et al. | 350—151 |
| 3,418,483 | 12/1968 | Fan | 350—151X |

DAVID SCHONBERG, Primary Examiner

P. R. MILLER, Assistant Examiner

U.S. Cl. X.R.

350—166